United States Patent [19]

Dezelan

[11] 4,077,484

[45] Mar. 7, 1978

[54] HYDRO-ELECTRICAL PRIORITY VALVE AND SPEED CONTROL CIRCUIT

[75] Inventor: Joseph E. Dezelan, Indian Head Park, Ill.

[73] Assignee: Caterpillar Tractor Co., Peoria, Ill.

[21] Appl. No.: 712,624

[22] Filed: Aug. 9, 1976

[51] Int. Cl.² .............................................. B60K 25/04
[52] U.S. Cl. ................................. 180/44 M; 180/66 R
[58] Field of Search ................. 180/44 M, 44 R, 44 F, 180/49, 66 B, 66 R, 103 R

[56] References Cited

U.S. PATENT DOCUMENTS

| Re. 28,324 | 1/1975 | Greene | 180/44 M X |
|---|---|---|---|
| 3,481,419 | 12/1969 | Kress | 180/44 M |
| 3,780,819 | 12/1973 | Coordes | 180/44 M X |
| 3,894,606 | 7/1975 | Hunck | 180/44 M X |
| 3,984,978 | 10/1976 | Alderson | 180/44 M X |
| 3,997,017 | 12/1976 | Campbell | 180/44 F |

*Primary Examiner*—Philip Goodman
*Assistant Examiner*—John A. Pekar
*Attorney, Agent, or Firm*—Phillips, Moore, Weissenberger, Lempio & Majestic

[57] ABSTRACT

The invention is concerned with an improvement in a hydrostatic auxiliary front wheel drive system for a vehicle which comprises a hydraulic implement pump, a hydraulic implement powered by the pump and motors drivingly connected to a front wheel shaft rotatable in a forward or a reverse direction, the motors being powered via motor conduits by the pump. The improvement of the invention comprises an electrical switch operating responsive to hydraulic pressure developed by the implement pump, the electrical switch a including biasing spring preventing switching thereof into a closed circuit position until the hydraulic pressure reaches a predetermined value and forcing the switch into an unswitched open circuit position when the hydraulic pressure drops below the predetermined value. Also part of the improvement is a valve in the motor conduits providing a pump hydraulic pressure shut-off mode, a forward direction mode leading to forward motion of the vehicle, and a reverse direction mode leading to reverse motion of the vehicle, the valve being constrained in the shut-off mode until the electrical switch switches into said closed circuit position. The improvement yet further comprises directional selection valves for selecting a respective one of the forward direction mode and the reverse direction mode when the switch is switched into the closed circuit position.

5 Claims, 2 Drawing Figures

HYDRO-ELECTRICAL PRIORITY VALVE AND SPEED CONTROL CIRCUIT

BACKGROUND OF THE INVENTION

1. Field of the Invention

The invention is concerned with vehicles wherein the back wheels are generally powered in a usual manner by the engine thereof. More particularly, the invention is concerned with such vehicles which include a hydrostatic auxiliary front wheel drive system which operates off of the pressure developed by a hydraulic implement pump such as the pump normally used to provide power steering and implement actuation for the vehicle. More particularly, the present invention is concerned with a unique hydro-electrical priority valve and speed control circuit which assures that power to a hydraulic implement such as the power steering function of a vehicle is not so severely reduced as to be inoperable when power from the hydraulic implement pump of such a vehicle is applied to the front wheel thereof thus providing four-wheel drive to the vehicle.

2. Prior Art

The prior art teaches the use of the implement pump of a vehicle to provide a hydrostatic auxiliary front wheel drive system for such a vehicle. For example, copending application Ser. Nos. 432,968, now abandoned; 432,969, now U.S. Pat. No. 3,997,017 both filed Jan. 14, 1974; and 547,906 filed Feb. 7, 1975, now abandoned, all commonly assigned herewith, each disclose such systems, which systems include in the case of applications Ser. Nos. 432,968 and 432,969 hydraulic priority valves.

None of the above-mentioned copending applications, however, provide hydro-electric means which act positively and rapidly to ensure that the implements driven by the implement pump will continue to operate in an adequate and full manner even when the hydraulic implement pump is being used to supply power to motors which drive the front wheels of the vehicle. This can create a very serious problem, especially when such an implement pump is used, as is usual, to provide power for a power steering system. What can occur is that a vehicle which is shifted into a mode wherein it makes use of the hydrostatic auxiliary front wheel drive system thereof can suddenly experience a significant drop in pressure to the hydraulic implement or implements being operated off the implement pump, for example, in the power steering system, and this can seriously interfere with operator control of the vehicle. The prior art hydraulic system for then shutting off the front wheel drive system provide that all pressure will then be applied to the implement system but the shift in application does not always occur in a sufficiently fast and positive manner to allow the operator to always have full control of the implement system. Accordingly, the present invention is concerned with an improvement in a hydrostatic auxiliary front wheel drive system for a vehicle which improvement assures that sufficient power is always available to operate a hydraulic implement from a hydraulic implement pump as well as providing power for the hydrostatic auxiliary front wheel drive system thereof when pump developed pressure is sufficiently high.

SUMMARY OF THE INVENTION

The invention comprises an improvement in a hydrostatic auxiliary front wheel drive system for a vehicle which comprises a hydraulic implement pump, a hydraulic implement powered by said pump and motor means drivingly connected to front wheel rotating shaft means rotatable in a forward or a reverse direction, the motor means being powered via motor conduit means by the pump. The improvement comprises electrical switch means operating responsive to hydraulic pressure developed by the pump, the electrical switch means including biasing means preventing switching thereof into a closed circuit position until the hydraulic pressure reaches a predetermined value and forcing the switch means into an unswitched open circuit position when the hydraulic pressure drops below the predetermined value. The improvement further includes valve means in the motor conduit means providing a pump hydraulic pressure shut-off mode, a forward direction mode leading to forward motion of the vehicle and a reverse direction mode leading to reverse direction of the vehicle, the valve means being constrained in the shut-off mode until the electrical switch means switches into the closed circuit position. The improvement still further includes directional selection means for selecting a respective one of the forward direction mode and the reverse direction mode when the switch means is switched into the closed circuit position.

BRIEF DESCRIPTION OF THE DRAWINGS

The invention will be better understood by reference to the figures of the drawings wherein like numbers denote like parts throughout, and wherein.

DETAILED DESCRIPTION OF THE PREFERRED EMBODIMENT

Figure 1:
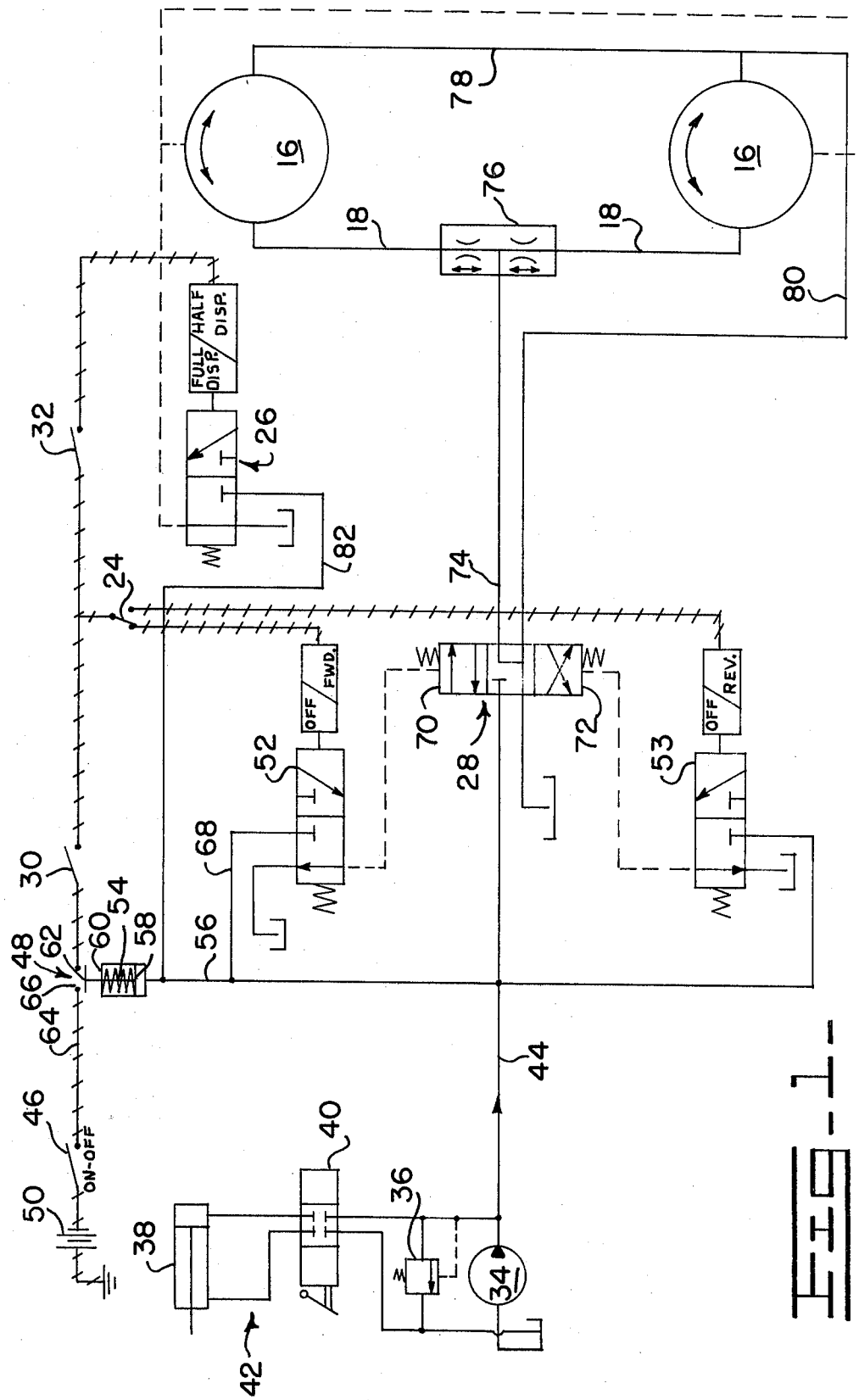
FIG. 1 illustrates schematically the electrical and hydraulic system of the present invention.
Figure 2:
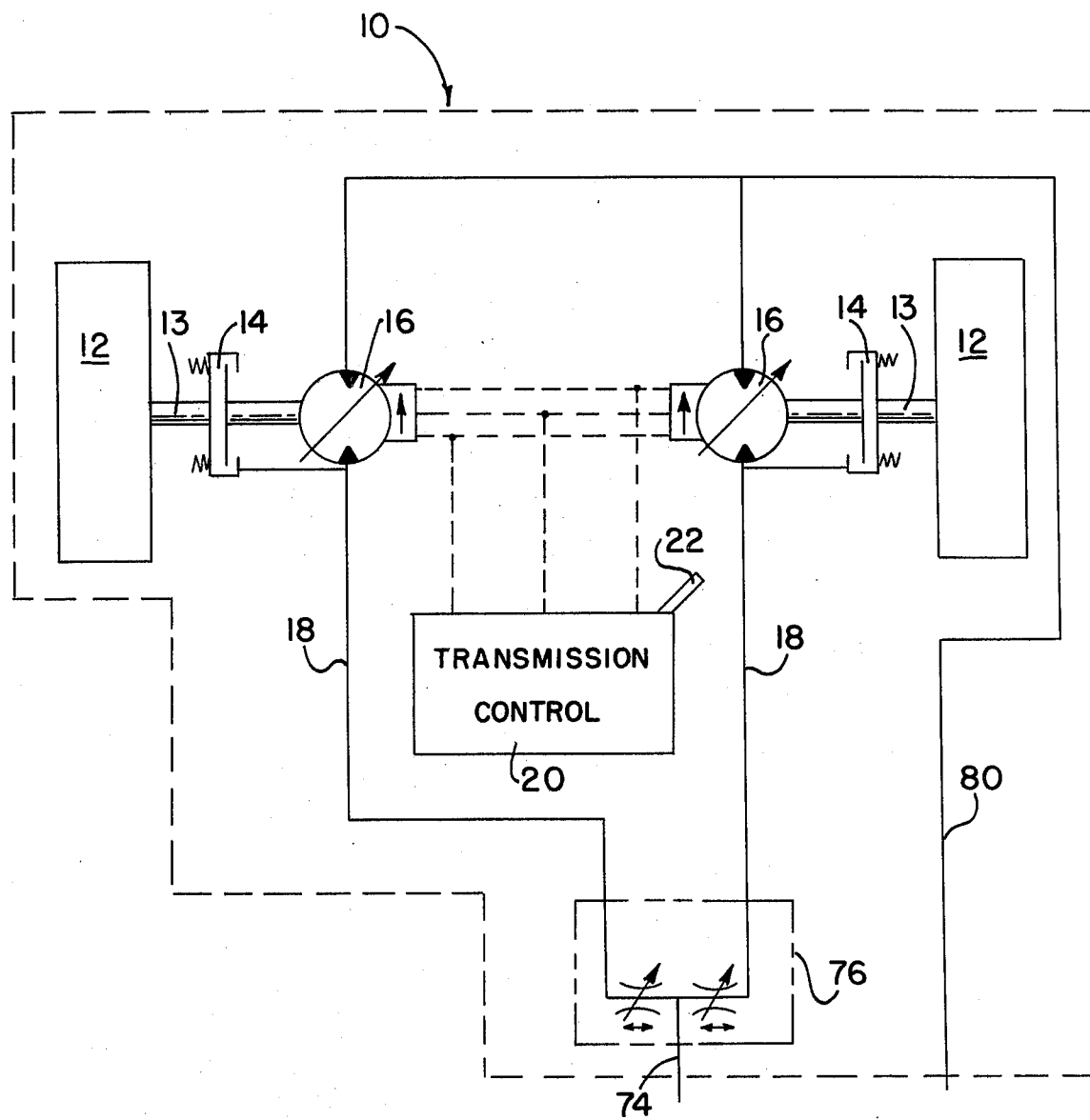
FIG. 2 illustrates, partially schematically, a vehicle including a hydrostatic auxiliary front wheel drive system and the improvement of the present invention.

A vehicle 10 is illustrated schematically in FIG. 2 having a pair of front wheels 12 each driven via a shaft 13 and a pressure actuated normally disengaged clutch 14 by a respective one of a pair of motors 16. Briefly, the motors 16 and the clutches 14 are powered by hydraulic pressure developed in a pair of lines 18 in a manner which will become apparent below. A transmission control 20 is actuated by a transmission control lever 22 or the like providing selection of any of a plurality of gear ranges for the main drive wheels of the vehicle, for example any of a first, second, third, fourth, fifth or sixth gear range, and via operation of a forward-reverse selection switch 24 (shown in FIG. 1) to provide selection of forward or reverse motion of the vehicle 10. A displacement control valve system 26 linked to the setting of the transmission control, generally as determined by the lever 22, adjusts the output from a pair of motors 16 to correspond to full displacement and maximum torque in first and second gears, for example, and to partial displacement and lower torque in, for example, third and fourth gears. As will be explained later, means are also generally provided whereby the front wheel drive is completely disconnected and not used in yet higher gears, for example, in fifth and sixth gears. In the embodiment illustrated, a forward-reverse valve 28 has a forward-reverse actuating switch 30 in the control circuit thereof while the displacement control valve 26 has a displacement actuating switch 32 in a circuit with the forward-reverse actuating switch 30. To accomplish the above-mentioned operation of the motor 16 to provide high torque in lower gears, low torque in intermediate gears and no torque in higher gears, one would arrange the transmission control level 22, for example, to keep the forward-reverse actuating switch 30 closed in, for example, first, second, third and fourth gears and open in fifth and sixth gears and would likewise, and at the same time, arrange the displacement control actuating switch 32 to be open in first, second, fifth and sixth gears and to be closed in third and fourth gears.

Referring now most particularly to FIG. 1, it will be seen that the motors 16 are run off of hydraulic pressure developed by a hydraulic implement pump 34 having a pressure relief valve 36 to relieve excess pressure developed thereby. A hydraulic implement 38, e.g., a steering system of the vehicle 10, is controllably operated through operator shifting of a directional valve 40. Overall, one has a hydraulic implement system 42 which is old and well known, and the individual components of which may vary but are themselves generally well known to the art. Pressure from the hydraulic implement pump 34 is supplied via a conduit 44 to the forward-reverse valve 28 which, in the embodiment illustrated in FIG. 1, is in a shut-off mode whereby flow of hydraulic fluid therethrough is prevented. The forward-reverse valve 28 is in a shut-off mode even though the forward-reverse switch 24 is in the forward direction, since an on-off switch 465 and the forward-reverse control actuating switch 30 are both open. Yet further, an electrical-hydraulic priority switch 48 is in an open position so that power from a battery 50 cannot be supplied to shift an off-forward solenoid-operated valve 52, or, when the forward-reverse switch 24 is thrown to the reverse position, an off-reverse solenoid-operated valve 53.

Turning now to the electrical-hydraulic priority switch 48, it is seen that this serves as electrical switch means and includes biasing means, namely a spring 54 therein biasing the electric-hydraulic priority switch 48 into an unswitched or open circuit position as illustrated in FIG. 1 when the hydraulic pressure developed by the hydraulic implement pump 34 is insufficient to overcome said biasing. The electrical-hydraulic priority switch 48 shifts or switches into a closed circuit position when the hydraulic pressure developed by the hydraulic implement pump 34 applied to said electrical-hydraulic priority switch 48 via a conduit 56 reaches a predetermined value. It will be seen that the particular electrical-hydraulic priority switch 48 illustrated comprises a piston 58 within a cylinder 60 and that hydraulic pressure delivered by the conduit 56 tends to force the piston 58 against the force exerted by the spring 54 and when sufficient pressure is built up within the cylinder 60 in opposition to the force of the spring 64, then a conductive contactor 62 is forced upwardly into contact with an electric line 64 thus providing a closed circuit position of the electrical-hydraulic priority switch 48 across the gap 66 in the electric line 64. For example, the spring 54, or other biasing means used in substitution therefor, might be set to require 1,200 p.s.i. pressure in the conduit 56 before the contactor 62 would be forced into position across the gap 66. This would ensure that sufficient pressure would be supplied to the hydraulic implement 38 to assure that it would continue to operate even though pressure was being supplied, as will be explained in following, to the motors 16.

With the on-off switch 46 thrown into the "on" position by the operator, and with sufficient pressure in the conduit 56 to cause the contactor 62 to bridge the gap 66 in the electric lines 64, the forward-reverse control activating switch 30 and the displacement control switch 32 are then controlled by the position of the transmission control lever 22 or, if desired, may be independently controlled. With the forward-reverse actuating switch 30 thrown into the closed circuit position, and with the forward-reverse switch 24 in the position illustrated in FIG. 1, i.e. in the forward position, the off-forward solenoid-operated valve 52 will be activated to shift said off-forward valve 52 leftwardly whereby pressure will be supplied from the conduit 56 via a branch conduit 68 and through the valve 52 against a first end 70 of the forward-reverse valve 28. Meanwhile, the off-reverse solenoid-operated valve 53 will remain unshifted since power is not supplied thereto to shift it. Thus, a second end 72 of the forward-reverse valve 28 wll be connected to drain via the off-reverse valve 53. This will cause the forward-reverse valve 28 to shift downwardly whereby pressurized fluid from the conduit 44 will pass through the forward-reverse valve 28 and a conduit 74 via a flow divider-combiner 76 and thence via the lines 18 to each of the motors 16. The fluid delivered under pressure to the motors 16 via the lines 18 will then leave the motors 16 via the lines 78 and 80 and proceed via the forward-reverse valve 28 and return to tank.

If the forward-reverse switch 24 is thrown in the reverse direction, then the off-forward valve 52 will be in the position illustrated in FIG. 1 and the off-reverse valve 53 will be forced leftwardly which will thereby cause increased pressure on the second end 72 of the forward-reverse valve 28 thus forcing said forward-reverse valve 28 to shift to the reverse mode of operation. In this mode of operation, pressure from the hydraulic implement pump 34 will be supplied via the conduit 44 to the forward-reverse valve 28 and then will pass through that valve and be supplied to the lines 80 and 78 and thence to the motors 16. Flow from the motors 16 will then return via the lines 18 and the flow divider-combiner 76 to the conduit 74 from whence it will travel through the forward-reverse valve 28 to tank.

With the displacement control activating switch 32 in the position illustrated, i.e. with the switch open, the displacement control valve 26, which is solenoid-operated, will be maintained in the position operated in FIG. 1. In this position, the motors 16 will have control means thereon connected to drain. In this position, the motors 16 will be operated at full displacement and develope their highest torque. In the particular embodiment illustrated, the motors shown are similar to those discussed in U.S. Pat. No. 3,815,478 and produced commercially by A. B. Haaglund and Soner Company of Sweden. When the displacement control switch 32 is thrown to its closed position this will apply power to the solenoid-operated displacement control valve 26 causing it to shift leftwardly to a half-displacement position. In that position, pressure from the conduit 56, which corresponds to pressure developed by the implement pump 34, will be supplied via a second branch conduit 82 and via the displacement control valve 26 to the motors 16. The pressure supplied to the motor 16 in this manner will serve to internally shift the motors 16 from their full-displacement mode to their half-displacement mode whereby they will develop a reduced amount of torque and correspondingly higher speed operation, as might be more desirable in higher gears.

It should be clear that the improvement of the present invention is directed to the electrical-hydraulic priority switch 48, the forward-reverse valve 28 and the forward-reverse switch 24, and is not meant to be limited to the particular motor arrangement illustrated or to the use of a displacement control valve 26 or the particular flow divider 76. Many changes can be made in these components without departing from the spirit of the invention. In particular, the flow divider-combiner 76 can, if desired, be made variable and the motors 16 can be made of the varible displacement variety in which case the displacement control valve 26 would be replaced by displacement control means which would control the displacement of the now-variable displacement pumps 16. Other changes will likewise be apparent to those skilled in the art with respect to the particular mode of operation for activating the forward-reverse valve 28 and with accomplishing the results caused by operation of the off-forward solenoid-operated valve 52 and the off-reverse solenoid-operated valve 53.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a hydrostatic auxiliary front wheel drive system for a vehicle which comprises a hydraulic implement pump, a hydraulic implement powered by said pump and motor means drivingly connected to front wheel rotating shaft means rotatable in a forward or a reverse direction, said motor means being powered via motor conduit means by said pump, an improvement comprising:

electrical switch means operating responsive to hydraulic pressure developed by said pump, said electrical switch means including biasing means preventing switching thereof into a closed circuit position until said hydraulic pressure reaches a predetermined value and forcing said switch means into an unswitched open circuit position when said hydraulic pressure drops below said predetermined value;

valve means in said motor conduit means providing a pump hydraulic pressure shut-off mode, a forward-direction mode leading to forward motion of said vehicle, and a reverse-direction mode leading to reverse motion of said vehicle, said valve means including means constraining said valve means in said shut-off mode until said electrical switch means switches to said closed circuit position; and said constraining means including directional selection means, in series circuit with said switch means, for selecting a respective one of said forward-direction mode and said reverse-direction mode when said switch means is switched into said closed circuit position.

2. An improvement as in claim 1, including means for selectively changing the speed and torque of said motor means.

3. An improvement as in claim 2, wherein said motor means comprises a pair of motors, each of which is respectively connected to drive a respective front wheel of said vehicle and said hydraulic implement comprises a steering system of said vehicle.

4. An improvement as in claim 3, wherein said electrical switch means comprises a cylinder with a piston therewithin, said piston being biased by spring means to prevent switching thereof into said closed circuit position and wherein pressure from said hydraulic implement pump enters said cylinder and forces said piston against the biasing of said spring means when said hydraulic pressure developed by said pump exceeds said predetermined value sufficiently to cause a conductive contactor carried by said piston to switch into said closed circuit position.

5. An improvement as in claim 3, wherein said directional selection means includes a forward-reverse control actuating switch controlled by a transmission control of said vehicle and said means for selectively changing the speed and torque of said motor means includes a displacement control actuating switch controlled by said transmission control of said vehicle, said forward-reverse control actuating switch controlling application of power to said valve means and said displacement control actuating switch controlling application of pressure to control each of said pair of motors, said transmission control including means to close said forward-reverse control actuating switch in low and intermediate range gears and to open said forward-reverse control actuating switch in higher range gears, said transmission control further including means to shift said displacement control actuating switch to provide for high torque, low speed operation of said motors in low gears, and high speed, low torque operation of said motors in intermediate gears.

* * * * *